United States Patent
Wei et al.

(10) Patent No.: US 9,541,712 B2
(45) Date of Patent: Jan. 10, 2017

(54) OPTICAL FIBER CONNECTOR ASSEMBLING DEVICE

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Le-Peng Wei, Shenzhen (CN); Zhi-Ming Li, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/699,486

(22) Filed: Apr. 29, 2015

(65) Prior Publication Data
US 2016/0025943 A1    Jan. 28, 2016

(30) Foreign Application Priority Data
Jul. 25, 2014 (CN) .......................... 2014 1 0357903

(51) Int. Cl.
G02B 6/00 (2006.01)
G02B 6/38 (2006.01)

(52) U.S. Cl.
CPC ........... *G02B 6/3833* (2013.01); *G02B 6/3887* (2013.01); *G02B 6/3898* (2013.01)

(58) Field of Classification Search
CPC ............................ G02B 6/3898; G02B 6/3887
USPC ........................ 385/134, 136, 137, 147, 53
See application file for complete search history.

(56) References Cited

U.S. PATENT DOCUMENTS

| | | | | |
|---|---|---|---|---|
| 6,095,695 A * | 8/2000 | Ohtsuka | ............... | G02B 6/3825 385/134 |
| 7,194,179 B1 * | 3/2007 | Bryant | ................. | G02B 6/3843 385/134 |
| 7,241,056 B1 * | 7/2007 | Kuffel | .................. | G02B 6/3806 385/60 |
| 7,346,963 B2 * | 3/2008 | Takahashi | ............... | F16G 11/10 24/136 R |
| 9,004,779 B2 * | 4/2015 | Horibe | ................. | G02B 6/3898 385/78 |
| 2006/0153515 A1 * | 7/2006 | Honma | ................ | G02B 6/3802 385/134 |
| 2009/0252460 A1 * | 10/2009 | Ohtsuka | ............... | G02B 6/3846 385/81 |

FOREIGN PATENT DOCUMENTS

| | | |
|---|---|---|
| CN | 100374890 C | 3/2008 |
| JP | H11-326646 A | 11/1999 |
| JP | 2001520760 A | 10/2001 |
| JP | 201190112 A | 5/2011 |

* cited by examiner

*Primary Examiner* — Robert Tavlykaev
(74) *Attorney, Agent, or Firm* — Zhigang Ma (57) ABSTRACT

An optical fiber connector assembling device includes a body defining an assembling space, a first fiber supporting groove, and a second fiber supporting groove. The first and second fiber supporting grooves are located at opposite sides of the assembling space and are coupled with the assembling space, the assembling device is used to precisely assemble and close together, or disassemble a fiber optic connector and an optic fiber.

17 Claims, 11 Drawing Sheets

OPTICAL FIBER CONNECTOR ASSEMBLING DEVICE

CROSS-REFERENCE TO RELATED APPLICATIONS

This application claims all benefits accruing under 35 U.S.C. §119 from China Patent Application No. 201410357903.5, filed on Jul. 25, 2014, in the China Intellectual Property Office, the disclosure of which is incorporated herein by reference.

FIELD

The subject matter herein generally relates to an optical fiber connector assembling device.

BACKGROUND

In the fiber-optic communication field, an optical fiber is connected to another optical fiber or an electronic device via an optical fiber connector. Transmission efficiency of optical signals between the optical fibers and the optical fiber connector depends on the precision of the connection between the optical fibers and the optical fiber connector.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to an optical fiber connector assembling device. The optical fiber connector assembling device comprises a body. The body defines an assembling space, a first fiber supporting groove, and a second fiber supporting groove. The first and second fiber supporting grooves are located at opposite sides of the assembling space and are coupled with the assembling space.

Figure 1:
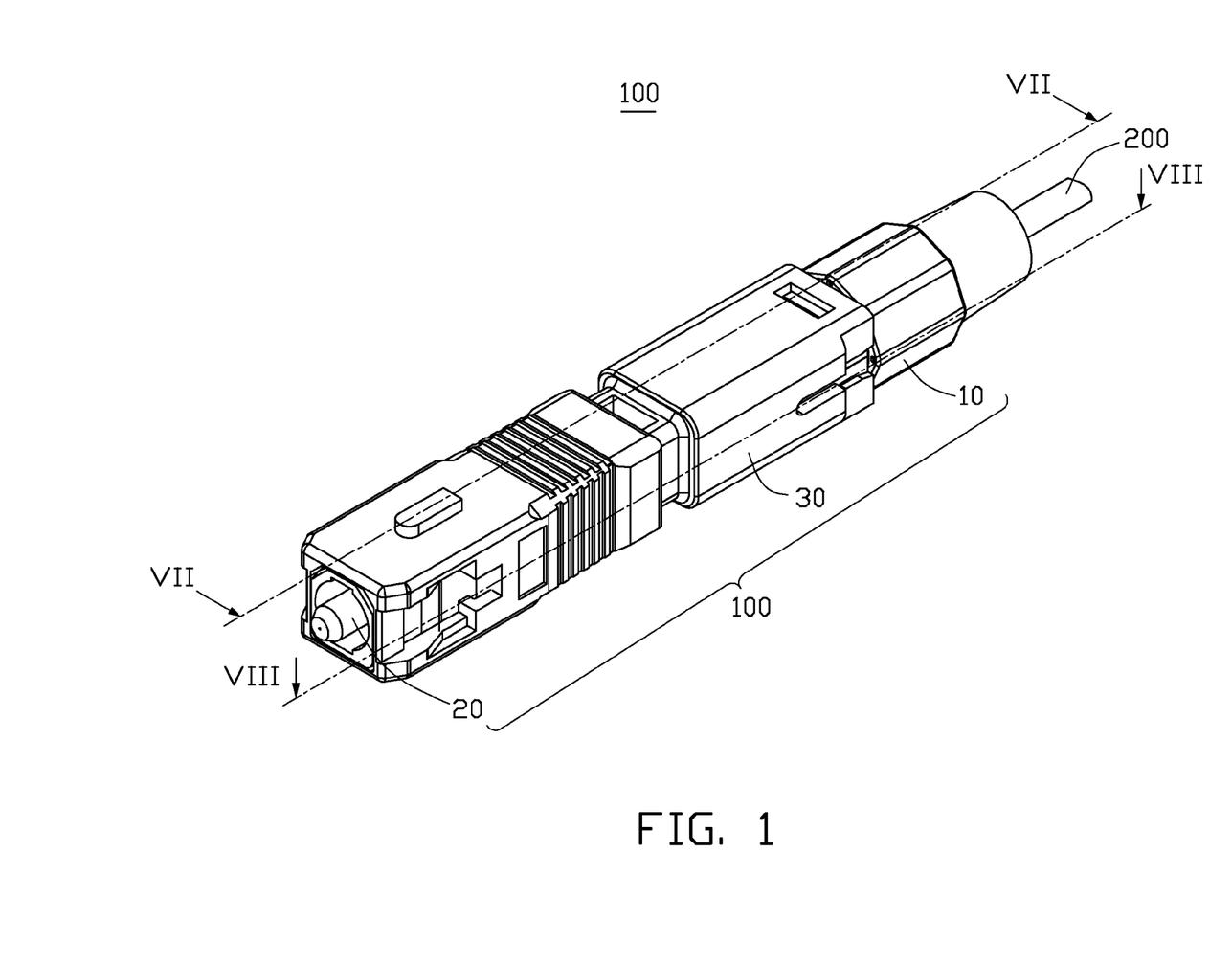
FIG. 1 is an isometric view of an embodiment of an optical fiber connector, which is assembled by an optical fiber connector assembling device.

FIG. 1 illustrates an optical fiber connector 100 for receiving an optical fiber 200. The optical fiber connector 100 includes a fiber fixing unit 10, a ferrule 20, and a shell 30 connecting the ferrule 20 to the fiber fixing unit 10.

Figure 2:
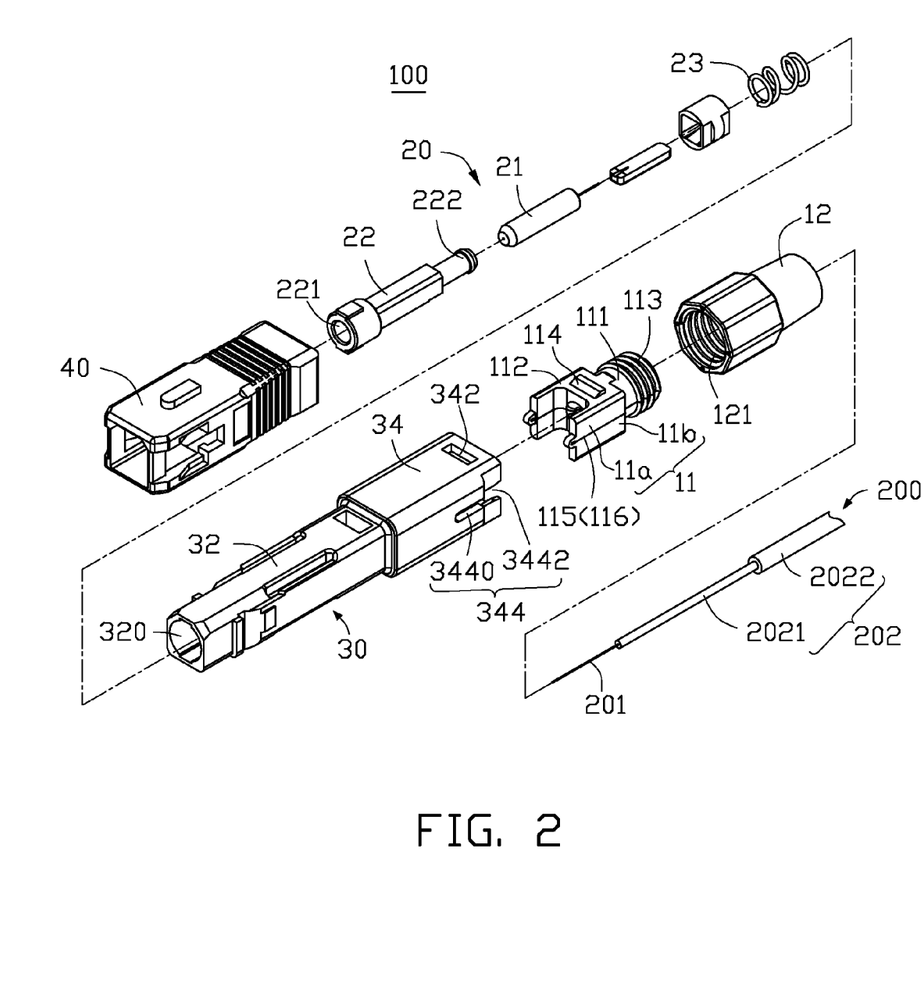
FIG. 2 is an exploded view of the optical fiber connector of FIG. 1.

FIG. 2 illustrates that each optical fiber 200 includes a core 201 and a cladding layer 202 surrounding the core 201. The cladding layer 202 is configured to protect the core 201. In one embodiment, the cladding layer 202 includes an inner cladding layer 2021 and an outer cladding layer 2022. Before being inserted into the optical fiber connector 100, the cladding layer 202 is peeled away for a predetermined length to expose the core 201. In one embodiment, more of the outer cladding layer 2022 is peeled away than the inner cladding layer 2021.

Figure 3:
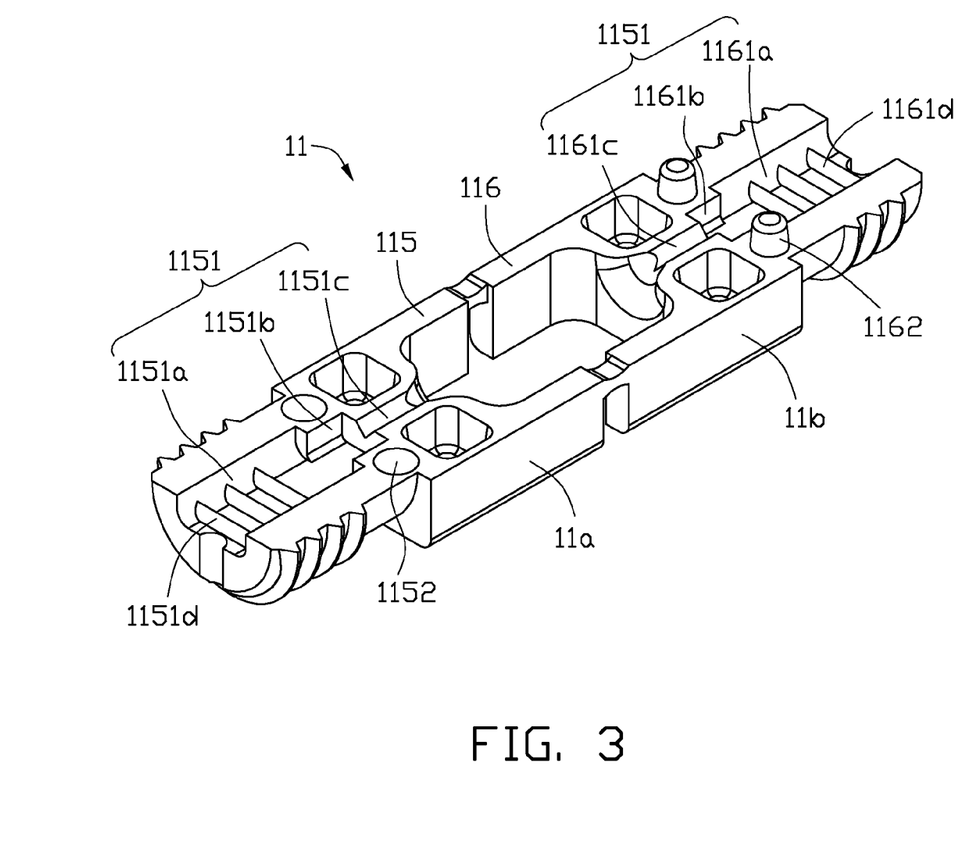
FIG. 3 is an exploded view of a fiber fixing unit of the optical fiber connector of FIG. 1.

FIG. 3 illustrates that the fiber fixing unit 10 is configured to fix the optical fiber 200. The fiber fixing unit 10 includes a clamping member 11 and a fixing sleeve 12. The clamping member 11 includes a first clamping portion 11a and a second clamping portion 11b coupled with the first clamping portion 11a. The first clamping portion 11a and the second clamping portion 11b cooperatively form a first connecting end 111 facing the fixing sleeve 12 and a second connecting end 112 facing the shell 30. The first connecting end 111 is substantially cylindrical. An external thread 113 is defined on the first connecting end 111. The second connecting end 112 is substantially a cube. Two locking blocks 114 protrude from the second connecting end 112. In one embodiment, one of the locking block 114 protrudes from a surface of the first clamping portion 11a facing away from the second clamping portion 11b. The other locking block 114 protrudes from a surface of the second clamping portion facing away from the first clamping portion 11a. The two locking blocks 114 are both substantially strip-like.

The first clamping portion 11a includes a first matching surface 115 facing the second clamping portion 11b. A first mounting groove 1151 and two locating holes 1152 are defined on the first matching surface 115. The first mounting groove 151 extends through the first matching surface 115, and includes a first groove portion 1151a, a second groove portion 1151*b*, and a third groove portion 1151*c*. The first groove portion 1151*a* is adjacent to the first connecting end 111. The third groove portion 1151*c* is adjacent to the second connecting end 112. The second groove portion 1151*b* is located between and connects the first groove portion 1151*a* and the third groove portion 1151*c*. The first, second, and third groove portions 1151*a*, 1151*b*, and 1151*c* have different diameters. Diameters of the first, second, and third groove portions 1151*a*, 1151*b*, and 1151*c*, in that order, are reduced. The first, second, and third groove portions 1151*a*, 1151*b*, and 1151*c* are used for clamping optical fibers of different sizes. In one embodiment, a plurality of ribs 1151*d* is defined on the bottom of the first groove portion 1151*a*. The ribs 1151*d* are each substantially parallel to each other and are substantially perpendicular to an extension direction of the first mounting groove 1151. The two locating holes 1152 are located at opposite sides of the first mounting groove 1151. In one embodiment, the two locating holes 1152 are substantially cylindrical blind holes.

The structure of the second clamping portion 11*b* is similar to that of the first clamping portion 11*a*. The second clamping portion 11*b* includes a second matching surface 116 facing the first clamping portion 11*a*. A second mounting groove 1161 is defined on the second matching surface 116. The second mounting groove 1161 corresponds to the first mounting groove 1151 and extends through the second matching surface 116. In one embodiment, the second mounting groove 1161 includes a first groove portion 1161*a*, a second groove portion 1161*b*, and a third groove portion 1161*c*. The first groove portion 1161*a* is adjacent to the first connecting end 111. The third groove portion 1161*c* is adjacent to the second connecting end 112. The second groove portion 1161*b* is located between and connects the first groove portion 1161*a* and the third groove portion 1161*c*. The first, second, and third groove portions 1161*a*, 1161*b*, and 1161*c* have different diameters. Diameters of the first, second, and third groove portions 1161*a*, 1161*b*, and 1161*c*, in that order, are reduced. In one embodiment, a plurality of ribs 1161*d* is defined on the bottom of the first groove portion 1161*a*. Two locating rods 1162 protrude from the second matching surface 116. The locating rods 1162 are located at opposite sides of the second mounting groove 1161 and correspond to the two locating holes 1152. The locating rods 1162 are configured to be inserted into the locating holes 1152. In one embodiment, the two locating rods 1162 are substantially cylindrical.

Referring to FIG. 2, the fixing sleeve 12 is substantially a cylindrical tube. An internal thread 121 is defined on an inner surface of a portion of the fixing sleeve 12 facing the clamping member 11. The internal thread 121 matches the external thread 113.

The ferrule 20 is configured for optically coupling the optical fiber connector 100 to an external component. The ferrule 20 includes an inserting core 21, a retainer 22, and an elastic member 23.

The inserting core 21 is substantially cylindrical and is made of ceramic. The inserting core 21 is configured to avoid damage to the core 201 when plugging in or pulling out the optical fiber connector 100.

The retainer 22 is substantially a rod, which is hollow throughout, and includes a first end 221 and a second end 222 opposite to the first end 221. The hollow is defined as a through hole 223 in the retainer 22. The through hole 223 extends from the first end 221 to the second end 222. An end of the inserting core 21 is inserted into the through hole 223 from the first end 221 and is fixed therein. The other end of the inserting core 21 extends to the outside of the retainer 22.

The elastic member 23 sleeves over the second end 222 of the retainer 22. In one embodiment, the elastic member 23 is a helical spring. An end of the elastic member 23 is fixedly-sleeved on the second end 222. The other end of the elastic member 23 extends for a predetermined length out from the second end 222.

The shell 30 is substantially a sleeve. The shell 30 includes a front shell 32 and a back shell 34 connected to the front shell 32. A first cavity 320 configured to receive the retainer 22 is defined in the front shell 32. The back shell 34 is substantially a hollow cube. A second cavity 340 coupled with the first cavity 320 is defined in the back shell 34. Two locking grooves 342 corresponding to the locking blocks 114 are defined on opposite sidewalls of the back shell 34. In one embodiment, the locking grooves 342 are through holes which are substantially rectangular. Two releasing slots 344 are defined on the other opposite sidewalls of the back shell 34. Each releasing slot 344 penetrates inner and outer surfaces of a sidewall and opens at an end surface of the back shell 34 facing away from the front shell 32. The releasing slot 344 is elongated. In one embodiment, each releasing slot 344 includes a first portion 3440 adjacent to the front shell 32 and a second portion 3442 facing away from the front shell 32. The second portion 3443 is coupled with the first portion 3440. A width of the second portion 3442 is greater than that of the first portion 3440.

The optical fiber connector 100 further includes a sheath 40 sleeved over the front shell 32. In one embodiment, the sheath 40 is substantially a rectangular sleeve. The sheath 40 is configured to match with the SC-type (standard connector type) optical fiber adapter.

Figure 4:
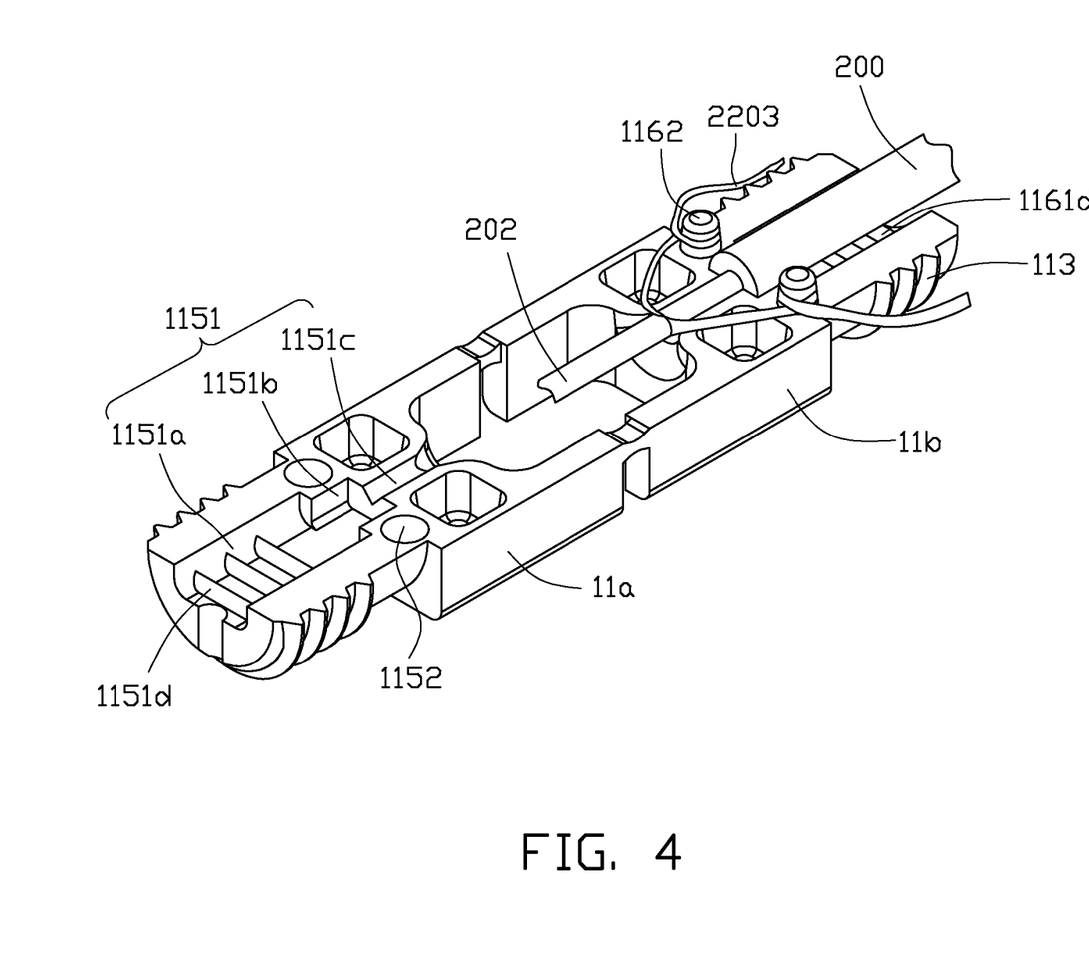
FIG. 4 is similar to FIG. 3, including an optical fiber received in the fiber fixing unit.

FIG. 4 illustrates that when assembling, the cladding layer 202 of the optical fiber 200 is peeled to expose the core 201. The peeled cladding layer defines two cladding layer strips 2023. One end of the optical fiber 200 with the strips 2023 is put in the second mounting groove 1161. The cladding layer strips 2023 are wrapped around the locating rods 1162, and the rest of the cladding layer strip 2023 is arranged on the external thread 113 of the first connecting end 111. The first clamping portion 11*a* and the second clamping portion 11*b* are coupled with each other. Each locating rod 1162 is inserted into a locating hole 1152. The ribs 1151*d*, 1161*d* press on the cladding layer 202 to prevent the optical fiber 200 from sliding. The fixing sleeve 12 is coupled to the first connecting end 111 of the clamping member 11. The internal thread 121 is engaged with the external thread 113 to fix the fixing sleeve 12 on the clamping member 11. The cladding layer strips 2023 arranged on the external thread 113 are clamped between the internal thread 121 and the external thread 113 to firmly fix the optical fiber 200 on the fiber fixing unit 10. After the optical fiber 200 is fixed on the fiber fixing unit 10, the exposed core 201 extending out of the fiber fixing unit 10 is cut to a predetermined length.

Figure 5:
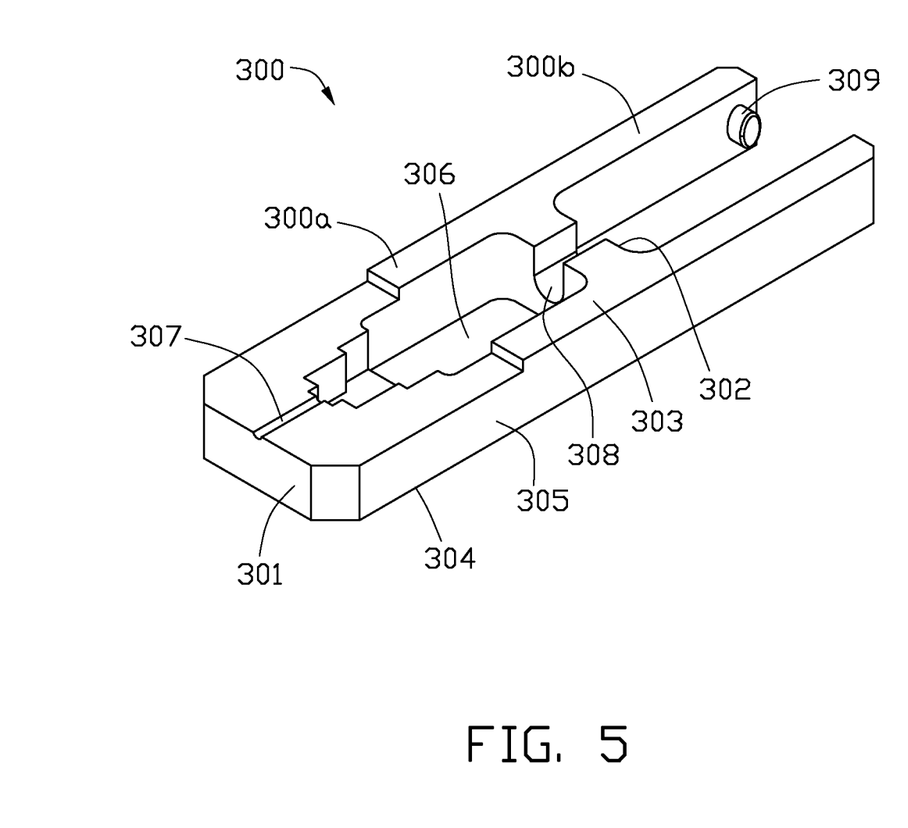
FIG. 5 is an isometric view of the optical fiber connector assembling device.
Figure 6:
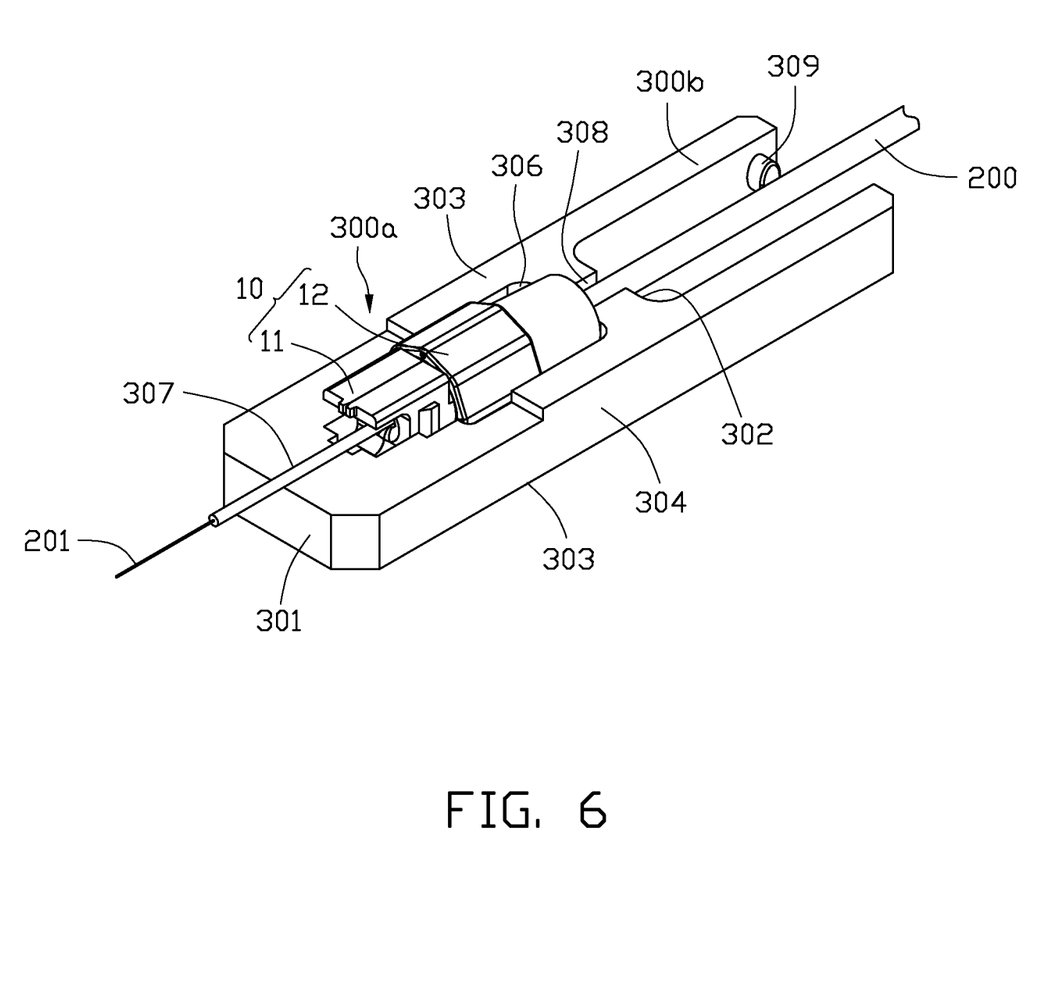
FIG. 6 is a diagrammatic view of the assembling of the optical fiber connector of FIG. 1 by the optical fiber connector assembling device of FIG. 5.
Figure 7:
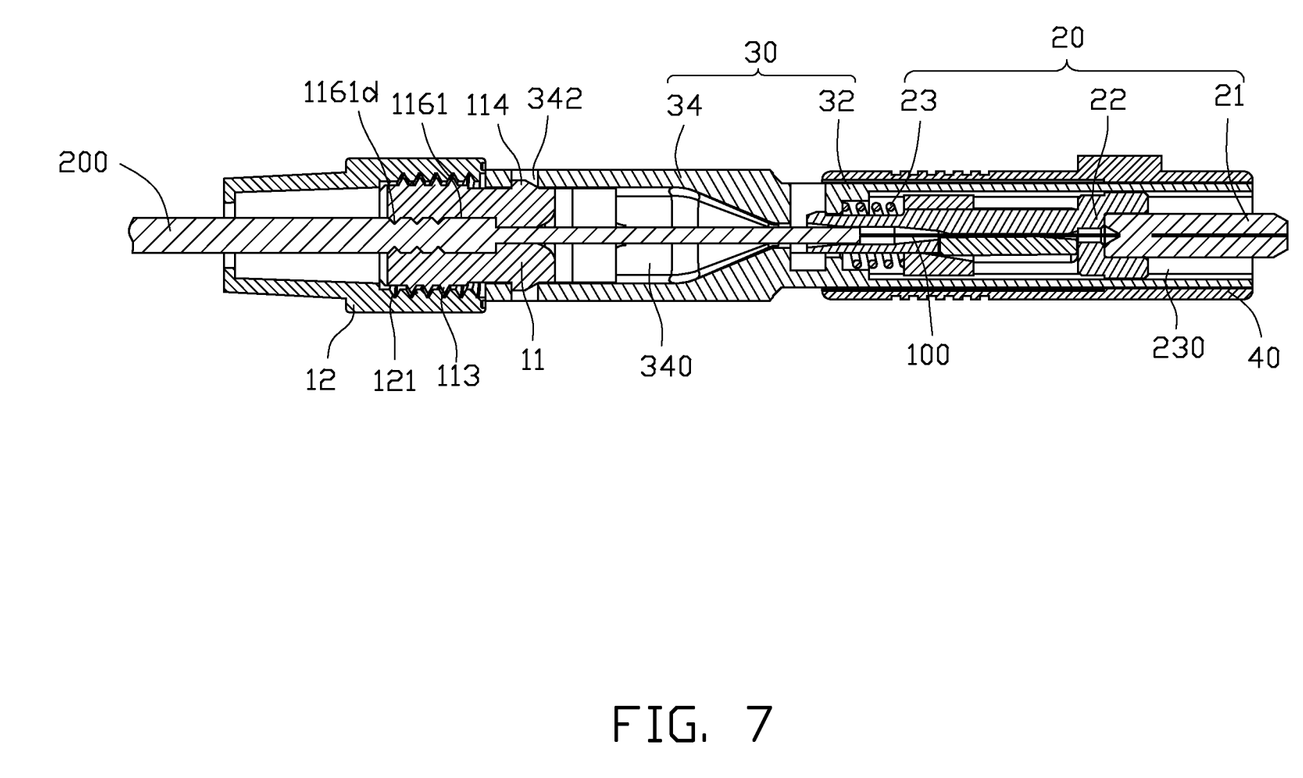
FIG. 7 is a cross-sectional view taken along VII-VII line of FIG. 1.
Figure 8:
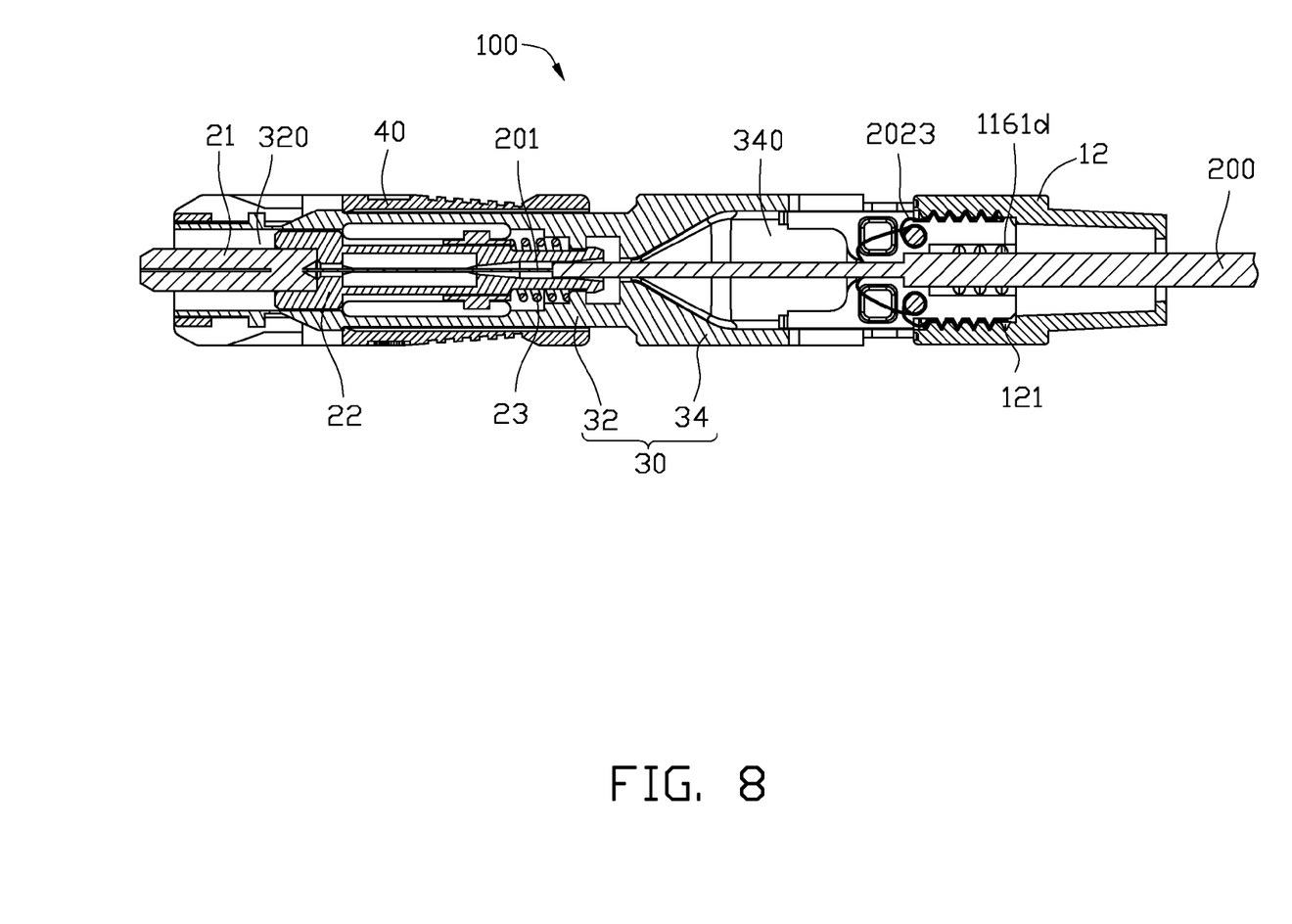
FIG. 8 is a cross-sectional view taken along VIII-VIII line of FIG. 1.

FIGS. 5 and 6 illustrate an optical fiber connector assembling device 300 configured to assemble the optical fiber connector 100. The optical fiber connector assembling device 300 includes a body 300*a* and two arms 300*b* extending from the body 300*a*. The body 300*a* is substantially a cube, and includes a first end surface 301, a second end surface 302 opposite to the first end surface 301, a top surface 303, a bottom surface 304 opposite to the top surface 303, and two side surfaces 305. In one embodiment, the first end surface 301 is substantially parallel to the second end surface 302. The top surface 303 is substantially parallel to the bottom surface 304. The two side surfaces 305 are substantially parallel to each other. The top surface 303, the bottom surface 304, and the two side surfaces 305 are substantially perpendicular to the first end surface 301 and the second end surface 302. The body 300*a* defines an assembling space 306 for receiving and fixing the fiber fixing unit 10. The assembling space 306 penetrates the top surface 303 and the bottom surface 304. The shape and size of the assembling space 306 are substantially similar to those of the fiber fixing unit 10 to enhance closeness of fitting of the fiber fixing unit 10 and the assembling space 306 to prevent the fiber fixing unit 10 from being released from the assembling space 306. The body 300*a* further defines a first fiber supporting groove 307 and a second fiber supporting groove 308 aligned with the first fiber supporting groove 307. The first fiber supporting groove 307 and the second fiber supporting groove 308 are coupled with the assembling space 306. The first fiber supporting groove 307 is adjacent to and extends through the first end surface 301. The second fiber supporting groove 308 is adjacent to and extends through the second end surface 302. In one embodiment, cross-sectional surfaces of the first and second fiber supporting grooves 307, 308 which are perpendicular to an extending direction of the first and second fiber supporting grooves 307, 308 are U-shaped. A size of the second fiber supporting groove 308 is greater than that of the first fiber supporting groove 307. The arms 300*b* are formed on the second end surface 302 and are adjacent to the side surfaces 305. The arms 300*b* are parallel to each other. The gap between the two arms 300*b* is greater than a distance between the opposite sidewalls of the back shell 34 with the releasing slots 344, so that the back shell 34 can be put between the two arms 300*b*. Each arm 300*b* includes a releasing block 309 at an inner surface facing the other arm 300*b*. The size of each releasing block 309 along a direction perpendicular to the top surface 303 is greater than that along a direction parallel to the top surface 303. The size of each releasing block 309 along a direction perpendicular to the top surface 303 is greater than the width of the first portion 3440 of the releasing slot 344 but is smaller than the width of the second portion 3442 of the releasing slot 344. The size of each releasing block 309 along a direction parallel to the top surface 303 is smaller than the width of the first portion 3440 of the releasing slot 344. The back shell 3430 is located between the two arms 300*b*, and each releasing block 309 clips into a releasing slot 344.

Referring to FIGS. 5 and 6, when cutting the core 201, the fiber fixing unit 10 with the optical fiber 200 fixed therein is inserted into the assembling space 306 of the optical fiber connector assembling device 300. An end of the optical fiber 200 extending out of the first end surface 301 is supported by the first fiber supporting groove 307. An end of the optical fiber 200 extending out of the second end surface 302 is supported by the second fiber supporting groove 308. The assembling device 300 is then put into a cutting device (not shown) and the first end surface 301 of the optical fiber connector assembling device 300 is used as a reference for cutting the core 201 to a length. In this way, the core 201 out of the fiber fixing unit 10 can be cut to a predetermined length.

Referring to FIGS. 1-2 and 7-8, when assembling the optical fiber connector 100, the ferrule 20 is received in the first cavity 320 and can elastically move relative to the shell 30. The second end 222 of the retainer 22 is inserted into the front shell 32 from an end of the front shell 32 opposite to the back shell 34, and clamps into an end of the front shell 32 adjacent the back shell 34. The elastic member 23 is compressed between the ferrule 20 and the front shell 32. The front shell 32 locks the second end 222 to prevent the retainer 22 from moving out of the front shell 32. When an external force is applied to the insert core 21 during the process of connecting the optical fiber connector 100 to another device, the insert core 21 can move towards the back shell 34 and the elastic member 23 can absorb any movement of the insert core 21. In this way, the external force will not damage the insert core 21. The second connecting end 112 of the fiber fixing unit 10 is inserted into the second receiving cavity 340 and the locking blocks 114 are engaged in the locking grooves 342 to fix the fiber fixing unit 10 in the shell 30. The core 201 is aligned with the insert core 21 and forms an arch. As the length of the core 201 outside of the fiber fixing unit 10 is predetermined, the size of the arch is also predetermined. Thus, there is no need to pull the optical fiber 200 back to adjust the arch to a predetermined size.

Figure 9:
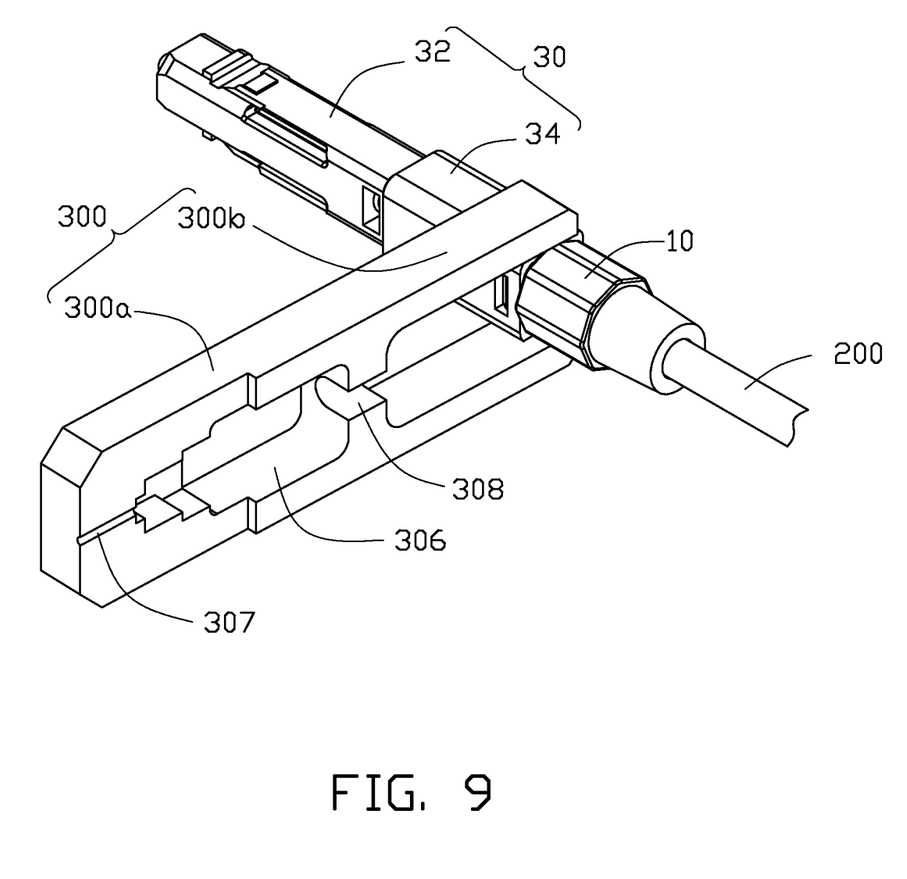
FIG. 9 is a schematic, isometric view showing the optical fiber connector assembling device of FIG. 5 inserted into the optical fiber connector of FIG. 1.
Figure 10:
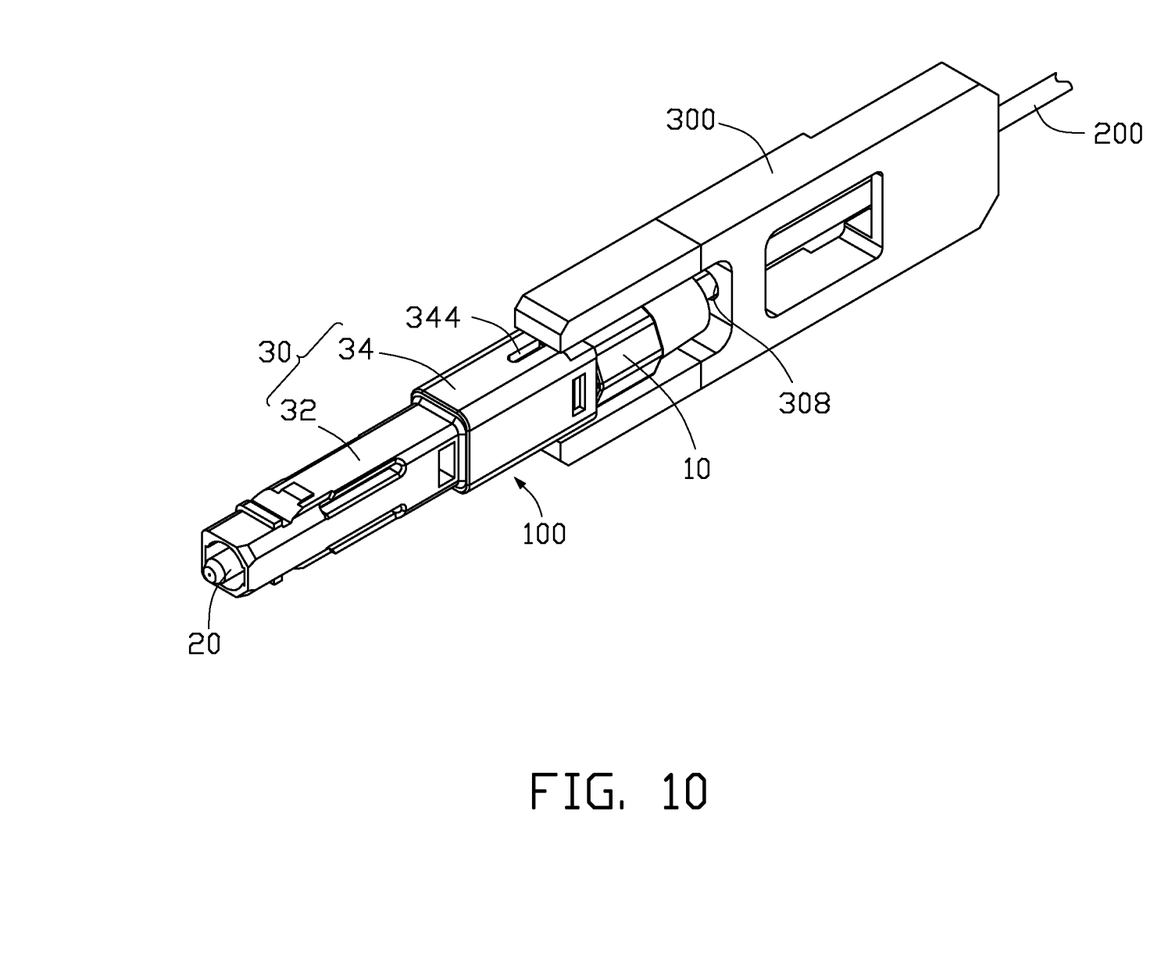
FIG. 10 is similar to FIG. 9, but showing the optical fiber connector assembling device is rotated through 90 degrees.
Figure 11:
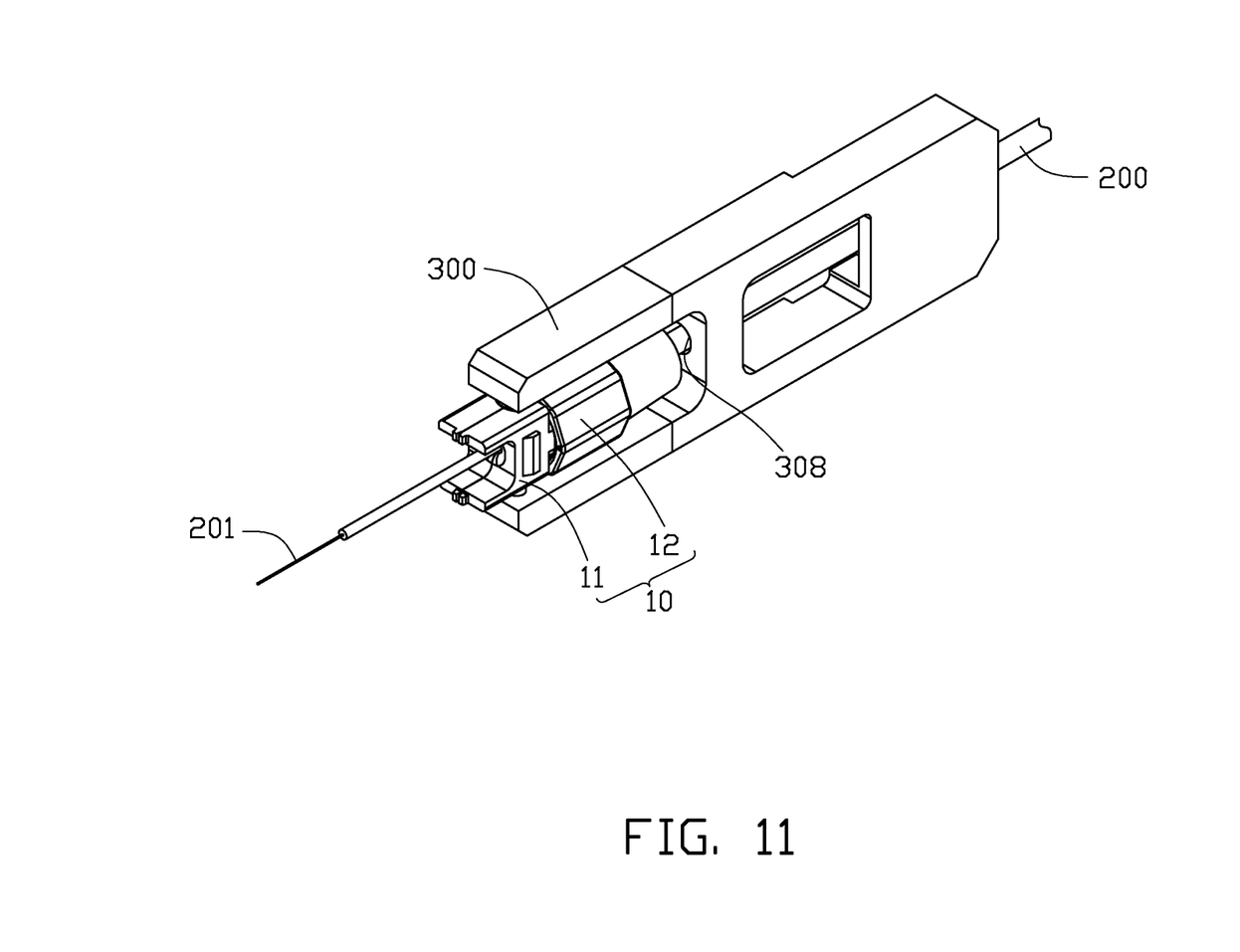
FIG. 11 is a isometric view showing the optical fiber connector assembling device holding the fiber fixing unit.

Referring to FIGS. 9-11, the assembled optical fiber connector 100 can be detached quickly using the assembling device 300. First, the optical fiber connector assembling device 300 is put at a first position so that a length of the optical fiber connector assembling device 300 runs perpendicular to a length of the optical fiber connector 100. As the size of the releasing blocks 309 along a direction parallel to the top surface 303 is smaller than the width of the first portion 3440, the releasing blocks 309 are inserted into the first portion 3440 of the releasing slots 344. Then the assembling device 300 is rotated to a second position so that the length of the optical fiber connector assembling device 300 is running parallel to the length of the optical fiber connector 100. As the size of each releasing block 309 along a direction perpendicular to the top surface 303 is greater than the width of the first portion 3440, the releasing slots 344 will be opened and the locking blocks 114 will be disengaged from the locking grooves 342. The fiber fixing unit 10 is positioned between the two arms 330*b* and the optical fiber 200 away from the clamping member 11 is supported in the second fiber supporting groove 308. Finally, the arm 300*b* can be held to pull the fiber fixing unit 10 out from the shell 30.

The embodiments shown and described above are only examples. Many details are often found in the art such as the other features of an optical fiber connector assembling device. Therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An optical fiber connector assembling device comprising:
 a body having a first side and a second side;
 the first side having a first fiber supporting groove formed therein;
 the second side having a second fiber supporting groove formed therein;
 the body defining an assembling space, wherein the first fiber supporting groove is located at an opposite end of the assembling space from the second fiber supporting groove;
 two arms, wherein the two arms extend away from the body, the two arms are located at opposite ends of the second end surface adjacent to side surfaces of the body and are parallel to each other at a predetermined interval;

wherein each arm defines a releasing block on an inner surface facing the other arm; and wherein each releasing block has a columnar shape, and a cross-section of each releasing block along a direction parallel to the arms is elliptical.

2. The optical fiber connector assembling device of claim 1, wherein the body comprises a first end surface, a second end surface opposite to the first end surface, a top surface, a bottom surface opposite to the top surface, and two side surfaces.

3. The optical fiber connector assembling device of claim 2, wherein the first fiber supporting groove extends through the top surface and the first end surface, the second fiber supporting groove extends through the top surface and the second end surface.

4. The optical fiber connector assembling device of claim 2, wherein the first end surface is substantially parallel to the second end surface, the top surface is substantially parallel to the bottom surface, the side surfaces are substantially parallel to each other, and the top surface, the bottom surface, and the side surfaces are substantially perpendicular to the first and second end surfaces.

5. The optical fiber connector assembling device of claim 1, wherein a size of the second fiber supporting groove is greater than that of the first fiber supporting groove.

6. The optical fiber connector assembling device of claim 1, wherein a size of each releasing block along a direction perpendicular to the top surface is different from that along a direction parallel to the top surface.

7. The optical fiber connector assembling device of claim 1, wherein the size of each releasing block along a direction perpendicular to the top surface is greater than that along a direction parallel to the top surface.

8. The optical fiber connector assembling device of claim 7, wherein the body comprises a first end surface, a second end surface opposite to the first end surface, a top surface, a bottom surface opposite to the top surface, and two side surfaces.

9. The optical fiber connector assembling device of claim 8, wherein the first fiber supporting groove extends through the top surface and the first end surface, the second fiber supporting groove extends through the top surface and the second end surface.

10. The optical fiber connector assembling device of claim 8, wherein the first end surface is substantially parallel to the second end surface, the top surface is substantially parallel to the bottom surface, the side surfaces are substantially parallel to each other, and the top surface, the bottom surface, and the side surfaces are substantially perpendicular to the first and second end surfaces.

11. The optical fiber connector assembling device of claim 7, wherein a size of the second fiber supporting groove is greater than that of the first fiber supporting groove.

12. The optical fiber connector assembling device of claim 2, wherein the assembling space penetrates the top surface and the bottom surface.

13. The optical fiber connector assembling device of claim 12, wherein the first fiber supporting groove extends through the top surface and the first end surface, the second fiber supporting groove extends through the top surface and the second end surface.

14. The optical fiber connector assembling device of claim 12, wherein the first end surface is substantially parallel to the second end surface, the top surface is substantially parallel to the bottom surface, the side surfaces are substantially parallel to each other, and the top surface, the bottom surface, and the side surfaces are substantially perpendicular to the first and second end surfaces.

15. The optical fiber connector assembling device of claim 12, wherein a size of the second fiber supporting groove is greater than that of the first fiber supporting groove.

16. The optical fiber connector assembling device of claim 1, wherein the releasing blocks are configured to provide a rotational axis for an optical fiber connector when disassembling a fiber fixing unit thereof from a shell.

17. The optical fiber connector assembling device of claim 1, wherein the assembling space has varying widths, and wherein a width of a portion of the assembling space adjacent to the second fiber supporting groove is greater than that of another portion of the assembling space adjacent to the first fiber supporting groove.

* * * * *